No. 753,653. PATENTED MAR. 1, 1904.
J. McE. AMES, J. P. LYON & G. E. RUSSELL.
HOPPER BOTTOM CAR.
APPLICATION FILED SEPT. 14, 1903.
NO MODEL. 5 SHEETS—SHEET 1.
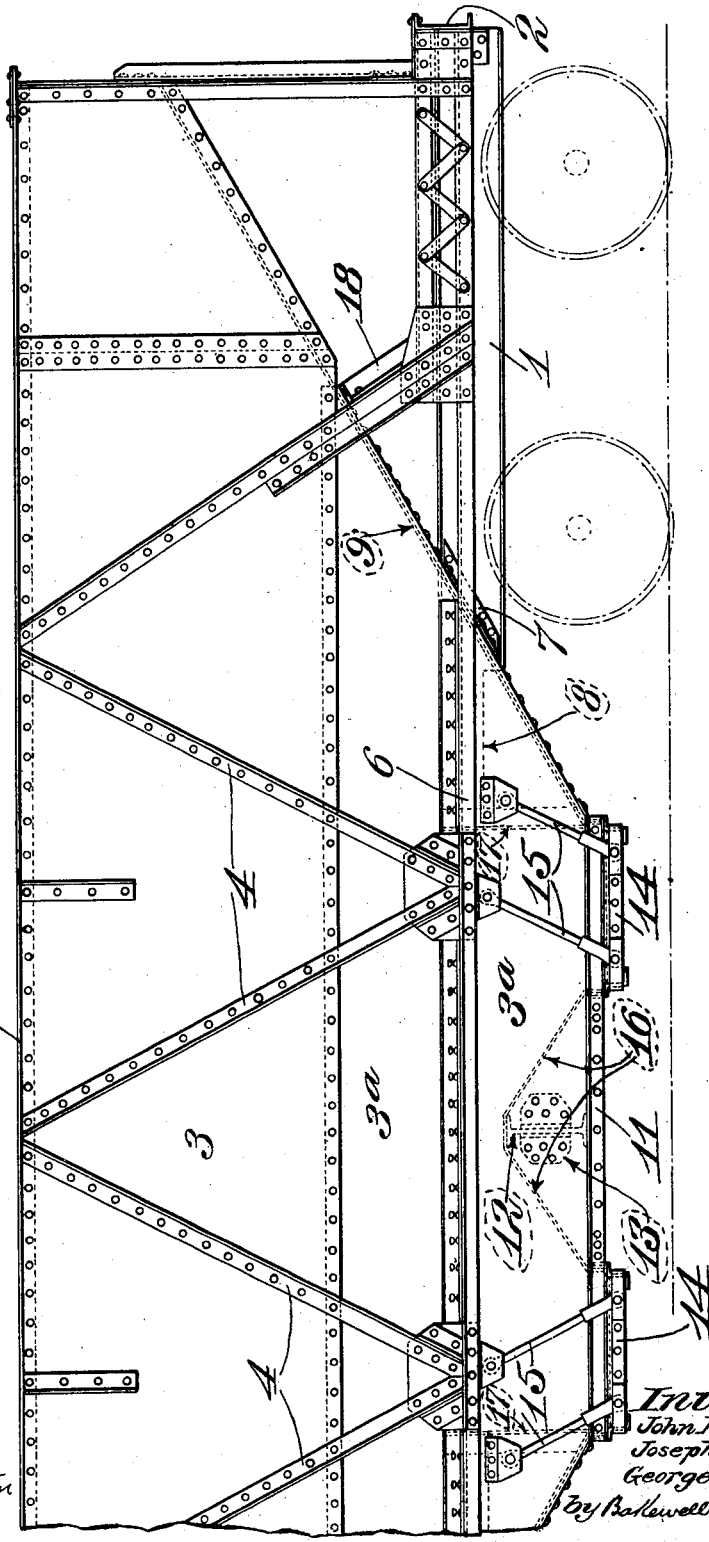
Witnesses:
G. A. Pennington
F. H. Gibbs
Inventors:
John McE. Ames,
Joseph P. Lyon,
George E. Russell,
By Bakewell & Cornwall
Attys.

No. 753,653. PATENTED MAR. 1, 1904.
J. McE. AMES, J. P. LYON & G. E. RUSSELL.
HOPPER BOTTOM CAR.
APPLICATION FILED SEPT. 14, 1903.
NO MODEL. 5 SHEETS—SHEET 2.
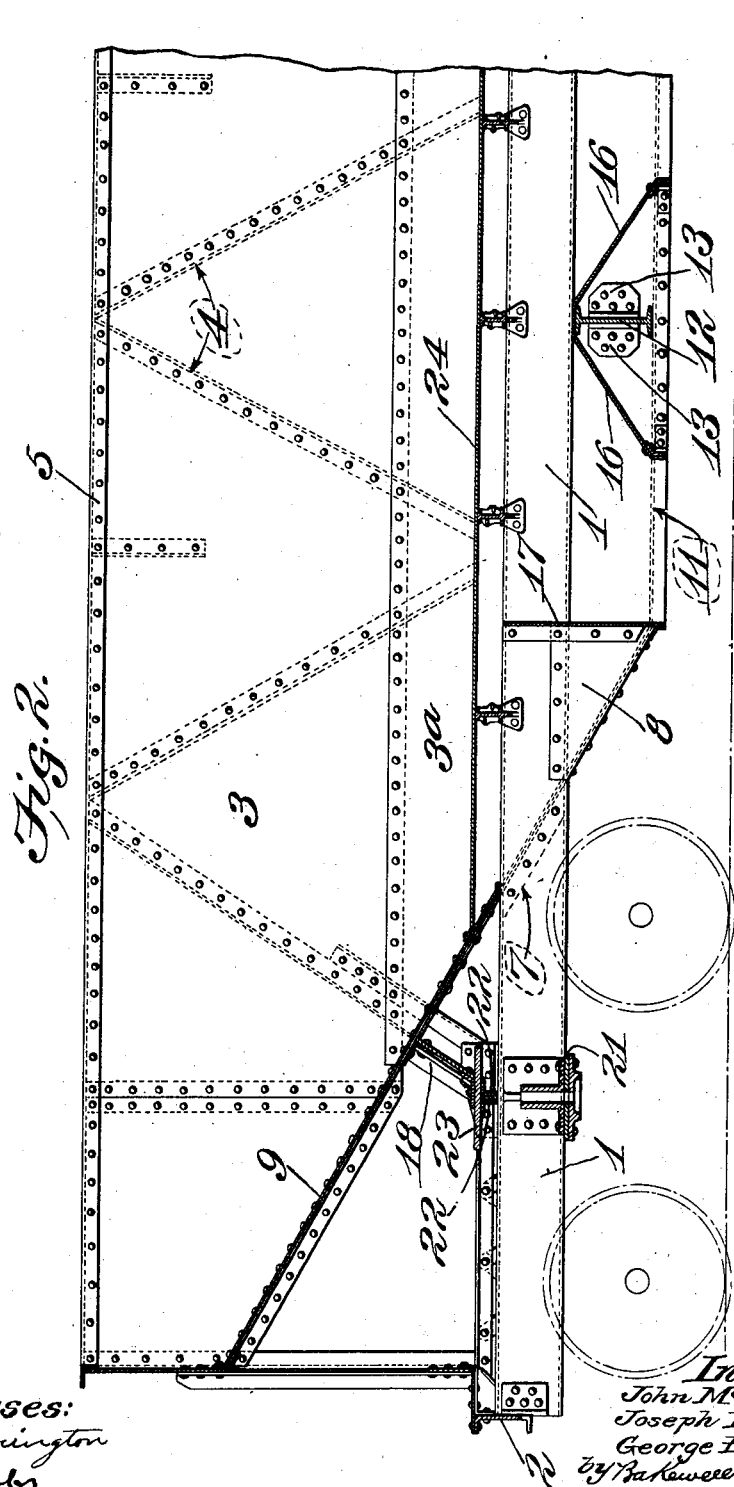
Witnesses:
G. A. Pennington
J. H. Sibbs
Inventors:
John McE. Ames,
Joseph P. Lyon,
George E. Russell,
by Bakewell & Cornwell
Attys.

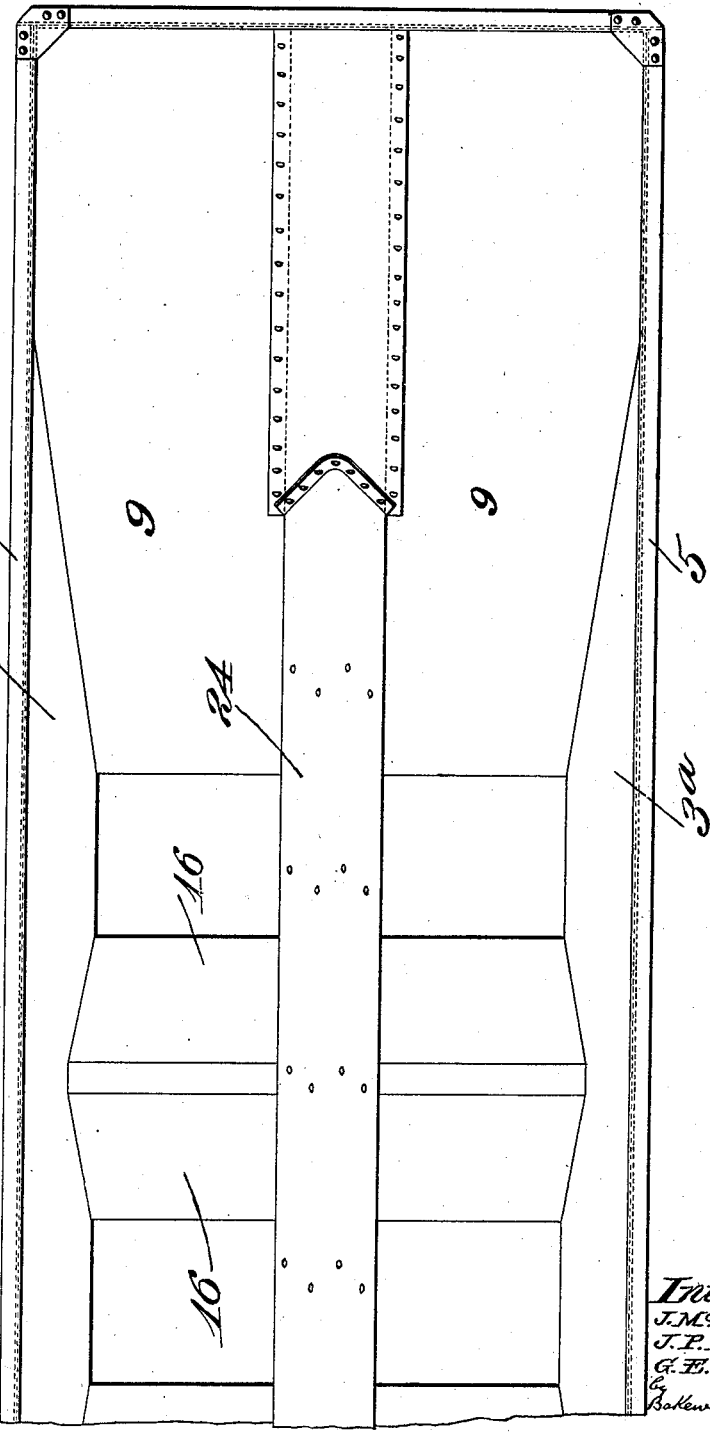

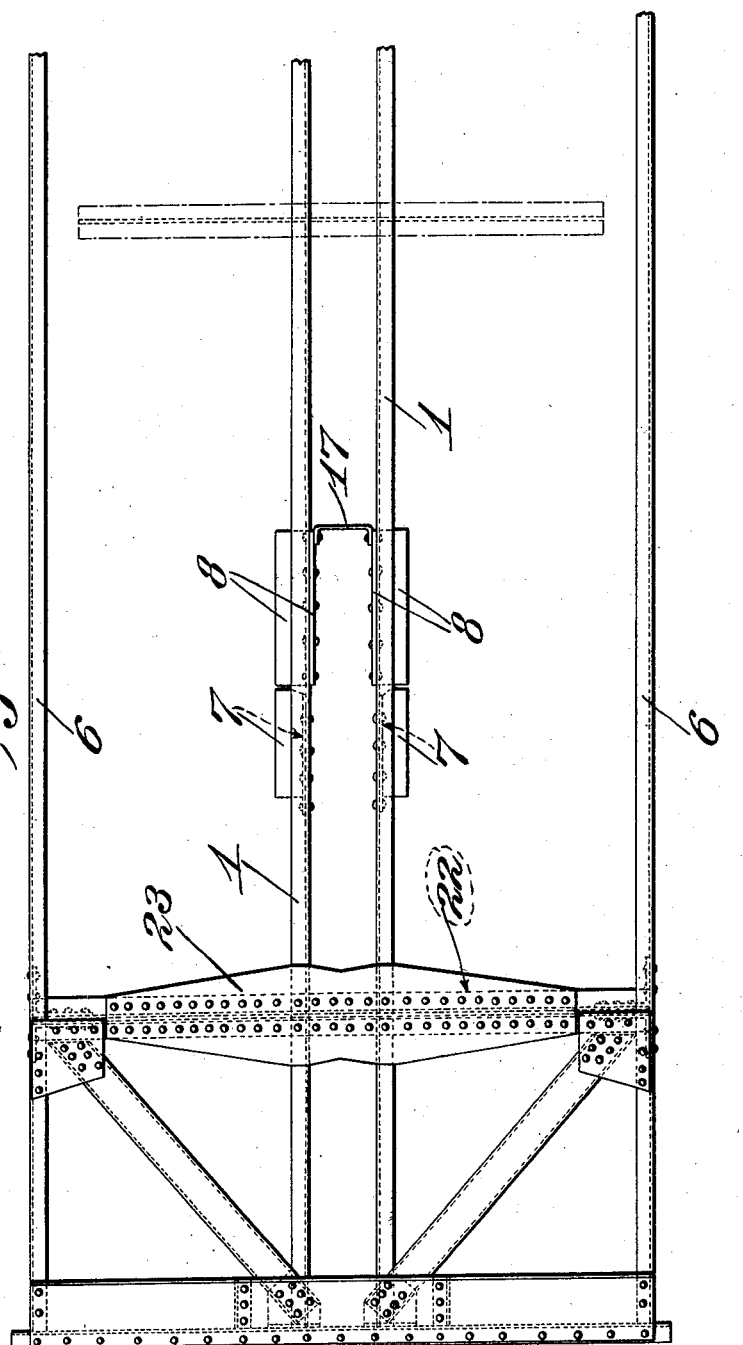

No. 753,653. PATENTED MAR. 1, 1904.
J. McE. AMES, J. P. LYON & G. E. RUSSELL.
HOPPER BOTTOM CAR.
APPLICATION FILED SEPT. 14, 1903.
NO MODEL. 5 SHEETS—SHEET 5.
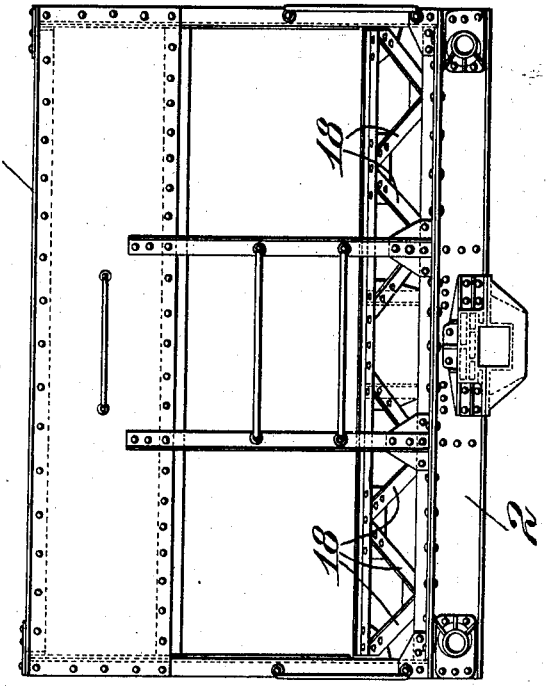
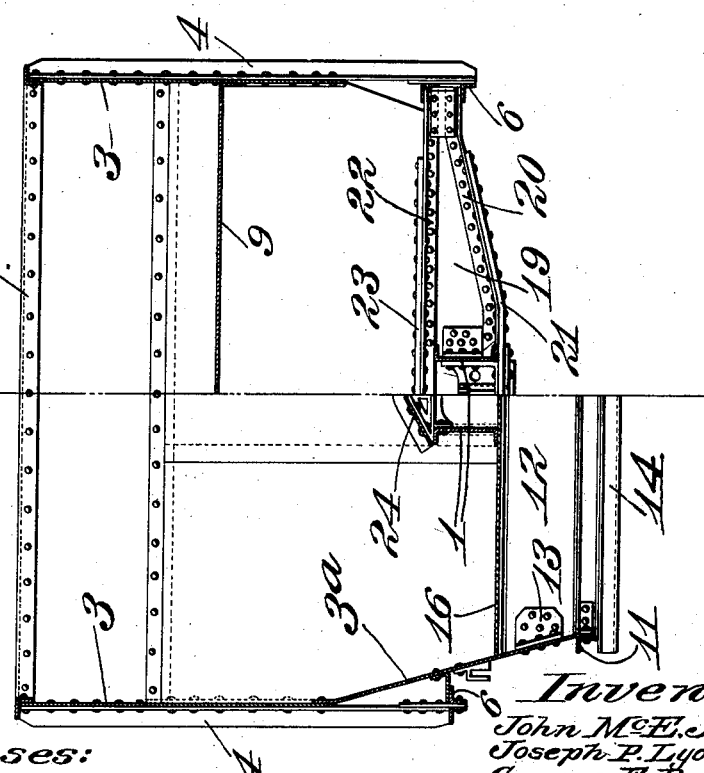
Witnesses:
G. A. Pennington
J. H. Gibbs
Inventors:
John McE. Ames,
Joseph P. Lyon,
George E. Russell,
by Bakewell & Cornwall
Attys.

No. 753,653.

Patented March 1, 1904.

UNITED STATES PATENT OFFICE.

JOHN McE. AMES, JOSEPH P. LYON, AND GEORGE E. RUSSELL, OF NEW YORK, N. Y., ASSIGNORS TO AMERICAN CAR & FOUNDRY COMPANY, OF ST. LOUIS, MISSOURI, A CORPORATION OF NEW JERSEY.

HOPPER-BOTTOM CAR.

SPECIFICATION forming part of Letters Patent No. 753,653, dated March 1, 1904.

Application filed September 14, 1903. Serial No. 173,201. (No model.)

*To all whom it may concern:*

Be it known that we, JOHN McE. AMES, JOSEPH P. LYON, and GEORGE E. RUSSELL, citizens of the United States, residing at New York, State of New York, have invented a certain new and useful Improvement in Hopper-Bottom Cars, of which the following is a full, clear, and exact description, such as will enable others skilled in the art to which it appertains to make and use the same, reference being had to the accompanying drawings, forming part of this specification, in which—

Figure 1 is a side elevational view of one end of the car. Fig. 2 is a central longitudinal section of the same. Fig. 3 is a plan view of one end of the car. Fig. 4 is a similar view of the underframe. Fig. 5 is a divided sectional view, and Fig. 6 is an end view.

This invention relates to improvements in hopper-bottom cars of that type wherein the side walls not only act as plate-girders, but also as upper chords for a trussed side framing, said trussed side framing carrying side hopper-sheets, to the lower edge of which are connected a cross-beam, preferably at the center of the car, said cross-beam being located in a plane under the center sills, which center sills are supported thereby. The center sills are preferably continuous from bolster to bolster and may extend beyond the bolsters to carry the draft-rigging. The cross-ridge sheet is arched over the cross-beam to act as a shed for the contents of the car, and in addition to this function said cross ridge or beam, connected to the lower edge of the side hopper-sheets and being a triangular section, acts as a lateral stiffener as well as contributing to the strength of the cross-beam to support the vertical load imparted thereto through the medium of the superposed center sill.

Our invention consists in the construction, arrangement, and combination of the several parts, all as will hereinafter be described and afterward pointed out in the claims.

Referring to the drawings, 1 represents the center sills, 2 the end sills, and 3 the plate-girder sides. 4 represents angular braces secured thereto and extending diagonally from the angle 5 to the angle 6. This side construction may be said to be a combination plate-girder side and trussed framing in that the wall 3 while acting as a plate-girder to a certain extent also acts as an upper chord of a trussed structure, of which the angle 6 is the lower chord and the inclined braces 4 the struts.

The sills 1 are channels, with their flanges preferably disposed outwardly, while secured to the web portion of said sills are angles 7, extending obliquely downwardly between the flanges of said sills. Upon the opposite side of said sills are secured substantially triangular flanged plates 8, the flanges of said latter plates, like 7, projecting outwardly, or in the direction of the side plates of the car, whereby said flanges provide suitable supporting means for the inclined end walls 9, which, with the side hopper-sheets $3^a$, form the hopper-section of the car.

Along the lower edges of the hopper-sections are secured angles 11, adapted to form the usual door-frame for the hopper discharge-opening.

Connected with the side hopper-sheets $3^a$ of the hopper-section and extending transversely across the car below the continuous center sills 1 is an I-beam 12, which is connected with said hopper-sheets $3^a$ by means of the brackets 13, as best shown in Fig. 2.

There are two discharge-openings for the hopper-section, and a plurality of doors 14 are supported in position by the usual links 15.

The cross-ridge is preferably in the form of a continuous sheet 16, extending from one door-opening above the girder 12 to the other door-opening, said sheet rising to the center sills 1 at its apex, as shown in dotted lines in Fig. 1 and in full lines in Fig. 2.

Between the center sills is secured a flanged plate 17, which extends downwardly therefrom and is joined at its edges to the plates 8, thereby forming a closure at each end of the hopper-section to prevent leakage thereat between the center sills.

Extending transversely across the car and supported upon the bolsters is a lattice-work composed of angles 18, with suitably-connected gusset-plates, whereby the inclined end walls 9 of the car are suitably supported. The bolster supporting these members consists of suitable web-plates 19, with angles 20 secured along the lower edges thereof, said web-plates and angles terminating at the center sills, while a bottom plate 21 extends substantially the length of the bolster and across below the said sills.

Secured along the upper edges of the web-plates 19 are continuous angles 22, extending across above the center sills, while a top cover-plate 23 substantially coextensive with the bolster is connected with said angles 22 and extends across above the center sills, as best shown in Fig. 5.

A continuous crown 24 extends above the center sills from end wall 9, to the corresponding end wall at the opposite end, and said crown is in substantially the same plane from end to end.

It will be observed with respect to the arrangement of parts at the bottom of the hopper-body that the space under the center sills and on each side of the cross-head 16 is open, so that the contents of the car may occupy this space and by so doing add to the capacity of the car, and, furthermore, that the door-openings are continuous from side hopper-sheet to side hopper-sheet.

We are aware that minor changes in the construction, arrangement, and combination of the several parts of our device can be made and substituted for those herein shown and described without in the least departing from the nature and principle of our invention.

Having thus described our invention, what we claim as new, and desire to secure by Letters Patent, is—

1. In a hopper-bottom car, side walls, a continuous cross-girder connected thereto, continuous center sills above said cross-girder, and a cross-ridge connected with said cross-girder and said side walls; substantially as described.

2. In a hopper-bottom car, the combination with side walls, bolsters, braces connecting said bolsters and side walls, side hopper-sheets, continuous center sills, a continuous cross-girder extending transversely below and supporting said center sills, and being connected with said side hopper-sheets, and a cross-ridge connected with said girder and with said side hopper-sheets; substantially as described.

3. In a hopper-car with side walls and side hopper-sheets, bolsters, a cross-girder fastened to the side hopper-sheets, longitudinal beams at the sides of the car connected to and supported by the bolsters and cross-girder, inclined end sheets supported by the bolsters and extending to a plane below said girder, and a cross-ridge supported by the side hopper-sheets, to the cross-girder, and by angles secured to the aforesaid longitudinal beams; substantially as described.

4. In a hopper-car, side sheets, a cross-girder extending continuously from side to side, and connected to the side sheets, inclined end sheets, doors extending across the opening between the side sheets, a cross-ridge below the sills of the underframing of the car, and suitable opening and closing apparatus for the doors; substantially a described.

5. In a hopper-car, side walls, a continuous cross-girder connected thereto, continuous center sills above said cross-girder, and a cross-ridge interposed between the cross-girder and the center sills; substantially as described.

6. In a hopper-bottom car, side sheets, continuous center sills, sheets, a longitudinal deflecting ridge extending in substantially the same plane from end to end, a continuous cross-girder supporting said center sills, said girder being connected with said sills and said side sheets, and adapted to support said sills and said deflecting crown, and a cross-ridge supported between the cross-girder and the longitudinal sills, substantially as described.

7. In a hopper-bottom car, a longitudinal deflecting crown extending past a plurality of hopper-openings, and supporting means therefor comprising side sheets, a continuous cross-girder connected with said side sheets, continuous center sills, and a cross-ridge connected to the cross-girder below the center sills; substantially as described.

8. In a hopper-bottom car, continuous center sills, side sheets, a cross-girder below the plane of said center sills and connected with said side sheets, a cross-ridge supported by the cross-girder, a bolster divided at the center sills, and continuous angles connected with bolster members and extending across said center sills; substantially as described.

9. In a car, the combination with side walls, of a cross-girder of triangular form, and center sills supported by and above said cross-girder; substantially as described.

10. In a car, the combination with side walls, and a center sill, of a cross-girder of triangular form attached to said side walls and extending under said center sill; substantially as described.

11. In a car, the combination with side walls, of a cross-girder comprising an I-beam and an arched plate forming a cross-ridge of triangular form; substantially as described.

12. In a car, the combination with side walls, of a cross-girder comprising an I-beam and an arched plate forming a cross-ridge of triangular form and resting on the top flange of the I-beam; substantially as described.

13. In a car, the combination with the longitudinal center sills, a cross-beam below the center sills, and an arched plate secured between the lower flanges of the center sills and the upper flanges of the cross-beam; substantially as described.

14. In a car, the combination with the side walls and the longitudinal center sills, of a continuous cross-beam below the center sills and connected to the side walls, and an arched plate below the center sills and intermediately supported on the cross-beam and having the ends of its lower edges connected to the side walls of the car; substantially as described.

In testimony whereof we hereunto affix our signatures, in the presence of two witnesses, this 31st day of August, 1903.

JOHN McE. AMES.
    JOSEPH P. LYON.
    GEORGE E. RUSSELL.

Witnesses:
    PHILIP B. SHERIDAN,
    JESSE Y. GLENN.